United States Patent
Komaru et al.

(10) Patent No.: US 11,971,394 B2
(45) Date of Patent: *Apr. 30, 2024

(54) ELECTRON CAPTURE DETECTOR

(71) Applicant: SHARP KABUSHIKI KAISHA, Sakai (JP)

(72) Inventors: Shohei Komaru, Sakai (JP); Tadashi Iwamatsu, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 809 days.

This patent is subject to a terminal disclaimer.

(21) Appl. No.: 17/047,606

(22) PCT Filed: Apr. 16, 2019

(86) PCT No.: PCT/JP2019/016322
§ 371 (c)(1),
(2) Date: Oct. 14, 2020

(87) PCT Pub. No.: WO2019/208328
PCT Pub. Date: Oct. 31, 2019

(65) Prior Publication Data
US 2021/0116428 A1   Apr. 22, 2021

(30) Foreign Application Priority Data
Apr. 26, 2018   (JP) ................. 2018-085365

(51) Int. Cl.
*G01N 30/70* (2006.01)
*G01N 27/66* (2006.01)
*H01J 49/08* (2006.01)

(52) U.S. Cl.
CPC ............. *G01N 30/70* (2013.01); *G01N 27/66* (2013.01); *H01J 49/08* (2013.01)

(58) Field of Classification Search
CPC ........ G01N 30/70; G01N 27/66; G01N 27/64; H01J 49/08
See application file for complete search history.

(56) References Cited

U.S. PATENT DOCUMENTS

| | | | |
|---|---|---|---|
| 6,023,169 A | 2/2000 | Budovich et al. | |
| 7,129,478 B2 | 10/2006 | Baba et al. | |
| 7,397,025 B2 | 7/2008 | Baba et al. | |
| 2005/0258354 A1 | 11/2005 | Baba et al. | |
| 2007/0023648 A1 | 2/2007 | Baba et al. | |

FOREIGN PATENT DOCUMENTS

| | | |
|---|---|---|
| JP | S53-032793 A | 3/1978 |
| JP | 2003-185635 A | 7/2003 |
| JP | 2004-077210 A | 3/2004 |
| JP | 2005-339812 A | 12/2005 |
| JP | 2008-232783 A | 10/2008 |

*Primary Examiner* — Jurie Yun
(74) *Attorney, Agent, or Firm* — ScienBiziP, P.C.

(57) ABSTRACT

The electron capture detector (100) is a device for detecting a sample (α1). The electron capture detector (100) includes a detection cell (1), a sample inlet (2), and an electron emitting element (20). The detection cell (1) forms a reaction chamber (6). The sample inlet (2) introduces a first carrier gas containing the sample (α1) into the reaction chamber (6). The electron emitting element (20) emits electrons (β) into the reaction chamber (6). An ion (α2) derived from the sample component is generated as a result of the electron emitting element (20) emitting electrons (β) into the reaction chamber (6).

12 Claims, 6 Drawing Sheets

ELECTRON CAPTURE DETECTOR

TECHNICAL FIELD

The present invention relates to an electron capture detector.

BACKGROUND ART

The electron capture detector described in PTL 1 includes a detection cell. Inside the detection cell, a radiation source, which is a radioisotope, and an electron capture electrode are provided. The detection cell has a gas inlet. The gas inlet introduces a sample gas containing a detection target component into the detection cell. In the electron capture detector, the detection cell is used as a negative electrode, and the electron capture electrode is used as a positive electrode, and a voltage is applied between the two electrodes. Then, the electron capture detector ionizes the gas molecules introduced from the gas inlet into the detection cell by means of the radiation emitted from the radiation source. Then, a current flows through the electron capture electrode due to the electrons generated as a result of ionizing the gas molecules. The electron capture detector detects the current flowing through the electron capture electrode.

CITATION LIST

Patent Literature

[PTL 1]
Japanese Unexamined Patent Application Publication No. 2008-232783

SUMMARY OF THE INVENTION

Problems to be Solved by the Invention

However, a radiation source is used as the ionization source for ionizing the gas molecules. When a radiation source is used as the ionization source, caution and management specific to radioactive substances are required. Therefore, ionization of the gas molecules (sample) requires complicated work.

The present invention has an object of providing an electron capture detector which is capable of easily ionizing a sample.

Solution to Problem

According to a first aspect of the present invention, an electron capture detector is a device for detecting a sample. The electron capture detector includes a detection cell, a sample inlet, and an electron emitting element. The detection cell forms a reaction chamber. The sample inlet introduces a first carrier gas containing the sample into the reaction chamber. The electron emitting element emits electrons into the reaction chamber.

Effect of the Invention

According to the present invention, a sample can be easily ionized.

MODE FOR CARRYING OUT THE INVENTION

An electron capture detector 100, which is an embodiment of the present invention, will be described with reference to the drawings. In the drawings, the same or corresponding sections are denoted by the same reference numerals, and the description will not be repeated.

First Embodiment

Figure 1:
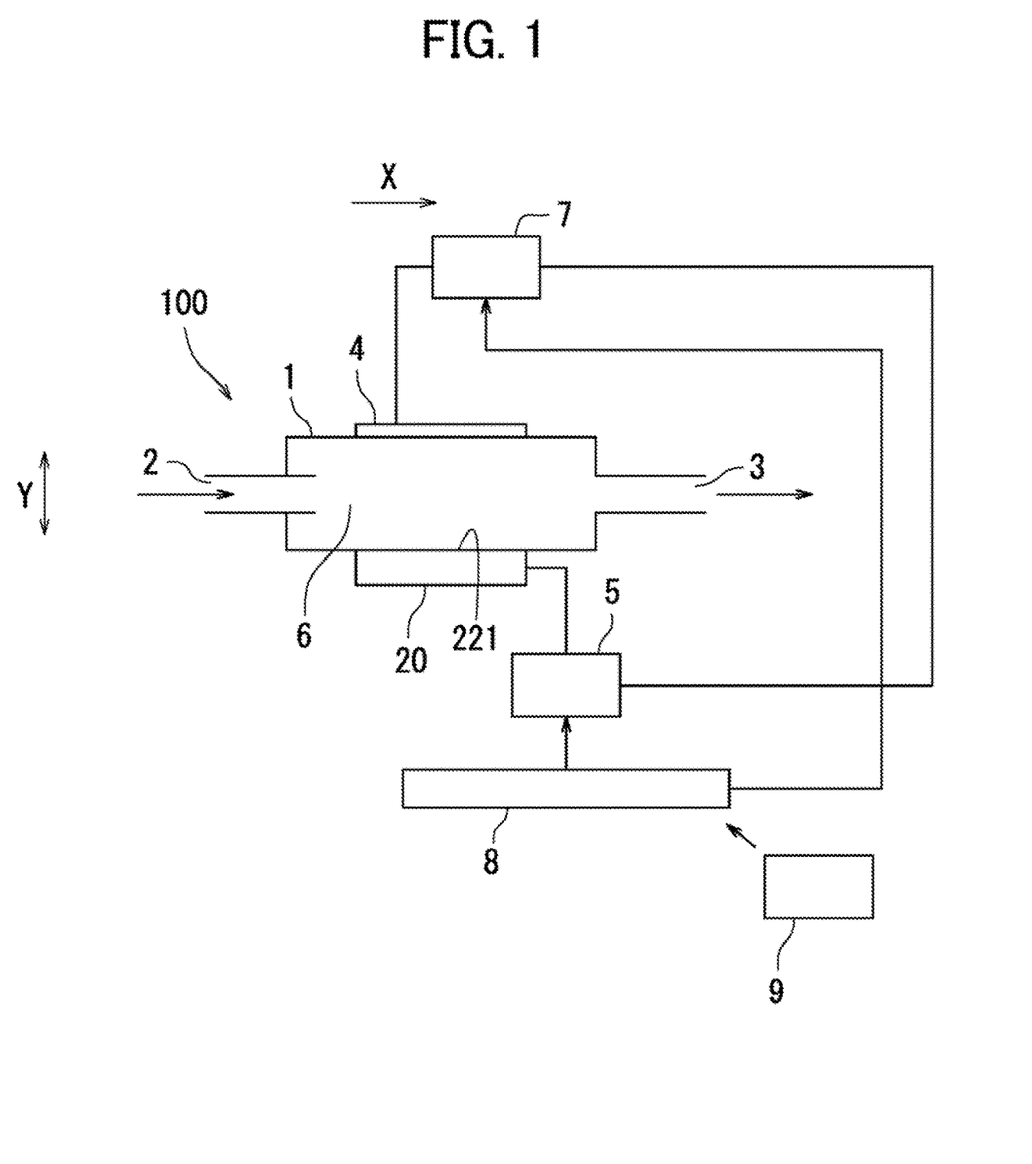
FIG. 1 is a schematic diagram showing a first embodiment of an electron capture detector.
Figure 2:
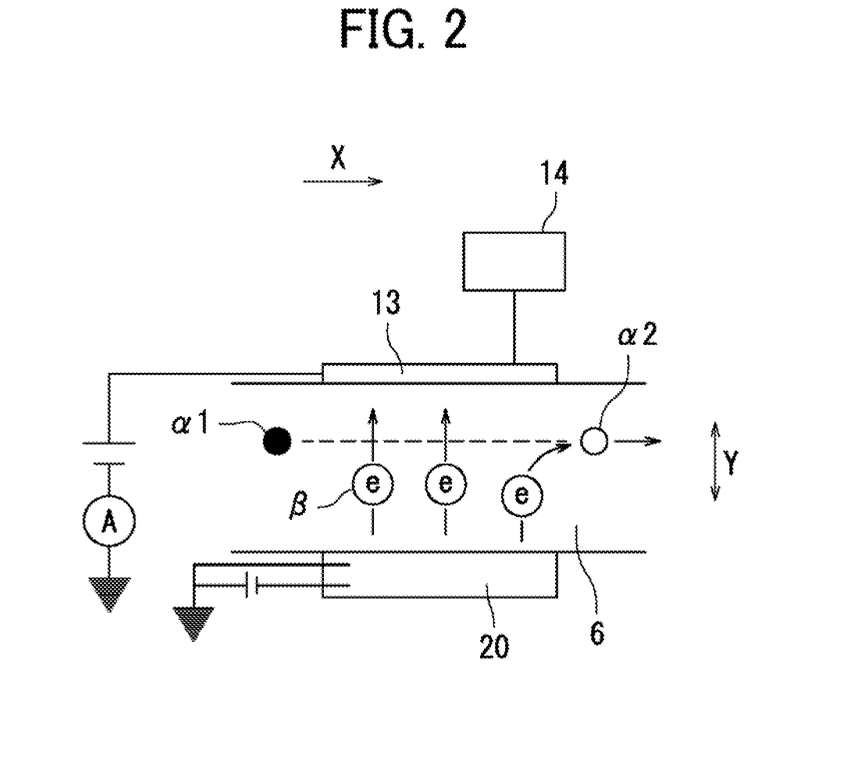
FIG. 2 is a partially enlarged view of the first embodiment of the electron capture detector.

A first embodiment of the electron capture detector 100 will be described with reference to FIG. 1 and FIG. 2. FIG. 1 is a schematic diagram showing the first embodiment of the electron capture detector 100. FIG. 2 is a partially enlarged view of the electron capture detector 100.

As shown in FIG. 1 and FIG. 2, the electron capture detector 100 is capable of detecting a substance that is negatively ionized. In the first embodiment, the detection target of the electron capture detector 100 is a sample α1. The electron capture detector 100 detects the number of samples α1. The electron capture detector 100 is capable of detecting the sample α1 at atmospheric pressure.

The sample α1 can be any molecule that can be ionized in the gas phase. The sample α1 represents, for example, a compound having a positive electron affinity, an organic compound (such as an organic solvent subject to the Japanese Ordinance on Prevention of Organic Solvent Poisoning), a pesticide, or an environmental substance.

The electron capture detector 100 is included, for example, in a gas chromatograph device. In this case, the electron capture detector 100 is used as the detector of the gas chromatograph device. The gas chromatograph device performs qualitative analysis and/or quantitative analysis of the sample α1 based on the detection result of the electron capture detector 100.

The electron capture detector 100 includes a detection cell 1, a sample inlet 2, an exhaust port 3, a counter electrode 4, a power supply unit 5, and an electron emitting element 20.

The detection cell 1 has a hollow shape. A reaction chamber 6 is formed inside the detection cell 1. The reaction chamber 6 is an empty space. The reaction chamber 6 has a square pillar shape. The sample inlet 2 and the exhaust port 3 are openings that each lead to the reaction chamber 6. The sample inlet 2 and the exhaust port 3 each communicate the reaction chamber 6 with the outside of the detection cell 1. The reaction chamber 6 is disposed between the sample inlet 2 and the exhaust port 3.

After being separated into molecules inside the gas chromatograph device, the sample α1 is introduced into the reaction chamber 6 via the sample inlet 2. Specifically, the gas chromatograph device introduces a first carrier gas containing the sample α1 into the reaction chamber 6 via the sample inlet 2. After being introduced into the reaction chamber 6, the first carrier gas is discharged to the outside of the detection cell 1 via the exhaust port 3.

FIG. 1 shows a movement direction X. The movement direction X shows the movement direction of the first carrier gas inside the detection cell 1. The movement direction X is formed in the direction from the sample inlet 2 toward the exhaust port 3 via the reaction chamber 6. The sample α1 moves in the movement direction X in the reaction chamber 6.

The first carrier gas represents, for example, a gas which is typically used in a gas chromatograph device. The first carrier gas represents an inert gas to which electrons β do not readily attach. Examples of the first carrier gas include gases such as helium, argon, hydrogen, and nitrogen.

The first carrier gas flows in the movement direction X at a prescribed speed. The prescribed speed is a speed that enables the sample α1 to pass through the reaction chamber 6 in the movement direction X without reaching the counter electrode 4.

The electron emitting element 20 represents an element that emits electrons β when a voltage is applied. The voltage applied to the electron emitting element 20 in order to emit the electrons β is preferably several V to several tens of V. Furthermore, it is preferable for the electrons β to be capable of being emitted at room temperature, under atmospheric pressure, and in a macroscopically planar fashion. The electron emitting element 20 and the counter electrode 4 are disposed with a spacing between them along a width direction Y. The width direction Y represents a different direction to the movement direction X. In the first embodiment, the width direction Y represents a direction which is perpendicular to the movement direction X. The electron emitting element 20 and the counter electrode 4 are each insulated so as to prevent discharging from the respective surroundings of the electron emitting element 20 and the counter electrode 4. The reaction chamber 6 is positioned between the electron emitting element 20 and the counter electrode 4.

The electron emitting element 20 is capable of emitting electrons β into an empty space at atmospheric pressure. The electron emitting element 20 emits electrons β into the reaction chamber 6. The electron emitting element 20 emits electrons β toward the counter electrode 4 when a voltage is applied between the electron emitting element 20 and the counter electrode 4. As a result, electrons β move along the width direction Y and toward the counter electrode 4 in the reaction chamber 6.

The power supply unit 5 is connected to the electron emitting element 20 and the counter electrode 4. The power supply unit 5 causes electrons β to be emitted from the electron emitting element 20 toward the counter electrode 4 via the reaction chamber 6 by applying a voltage between the electron emitting element 20 and the counter electrode 4. The power supply unit 5 applies a voltage between the electron emitting element 20 and the counter electrode 4 such that the potential of the counter electrode 4 becomes higher than the potential of the electron emitting element 20. As a result, the electrons β emitted by the electron emitting element 20 move toward the counter electrode 4.

As described above with reference to FIG. 1 and FIG. 2, the sample α1 that flows into the detection cell 1 via the sample inlet 2 is introduced into the reaction chamber 6. Then, in the reaction chamber 6, the electrons β emitted from the electron emitting element 20 attach to the sample α1, which is a molecule. In this case, the electrons β attach to the sample α1 via an electron attachment phenomenon. Further, when the electrons β attach to the sample α1, the sample α1 is ionized. As a result, an ion α2 derived from the sample is generated. In the first embodiment, the ion α2 is a negative ion. Note that the ion α2 derived from the sample component represents an ionized form of the sample α1.

Furthermore, the electron capture detector 100 generates the ion α2 using the electron emitting element 20. Therefore, the electron capture detector 100 is capable of generating the ion α2 without using a radiation source. As a result, it is possible to easily ionize the sample α1 without the need for caution and management specific to radioactive substances. Moreover, because a member that shields the radiation is unnecessary, the electron capture detector 100 can be made smaller.

In addition, as a result of using the electron emitting element 20, the electron capture detector 100 is capable of directly generating the ion α2 without ionizing a carrier gas, which is required for corona discharge and the like. Therefore, because an increase in free electrons does not occur due to the Penning effect, the problem of peak inversion that occurs in non-radiation source electron capture detectors is resolved.

Also, by using the electron emitting element 20 as the ionization source, it is possible for the power source of the electron capture detector 100 to be made smaller compared to a case where a radiation source or corona discharge is used as the ionization source. As a result, the electron capture detector 100 can be made smaller.

A typical electron capture detector uses a radiation source or corona discharge as the ionization source. Further, a typical electron capture detector ionizes the sample α1 using the electrons β emitted as a result of ionizing a prescribed gas. The prescribed gas represents the first carrier gas, a make-up gas, a dopant gas, or a Penning gas introduced from the gas chromatograph device into the electron capture detector. The make-up gas is a gas containing helium. The dopant gas is a gas containing xenon. The Penning gas is a gas containing a substance with a lower ionization potential than the dopant gas. In contrast, the electron capture detector 100, which is the first embodiment of the present invention, does not ionize the first carrier gas, the make-up gas, the dopant gas, or the Penning gas. Therefore, because a device for flowing the prescribed gas is unnecessary, the device configuration of the electron capture detector 100 can be simplified. As a result, the electron capture detector 100 can be made smaller.

Next, the electron capture detector 100 will be described further with reference to FIG. 1.

As shown in FIG. 1, the electron capture detector 100 further includes a current detector 7, a controller 8, an input unit 9, and a storage unit (not shown).

The current detector 7 detects a current I flowing through the counter electrode 4. The current I flows through the counter electrode 4 as a result of the electrons β emitted by the electron emitting element 20 reaching the counter electrode 4.

The controller 8 includes a processor such as a CPU (Central Processing Unit) or an MPU (Micro Processing Unit). The controller 8 controls each of the components of the electron capture detector 100. Specifically, the processor of the controller 8 controls the power supply unit 5 and the current detector 7 by executing a computer program stored in a storage unit such as an HDD.

The input unit 9 accepts instructions issued with respect to the electron capture detector 100. The input unit 9 is connected to the controller 8. Information indicating the content of the instructions accepted by the input unit 9 is transmitted to the controller 8. As a result, the controller 8 controls each of the components of the electron capture detector 100 according to the content of the instructions accepted by the input unit 9.

Figure 3:
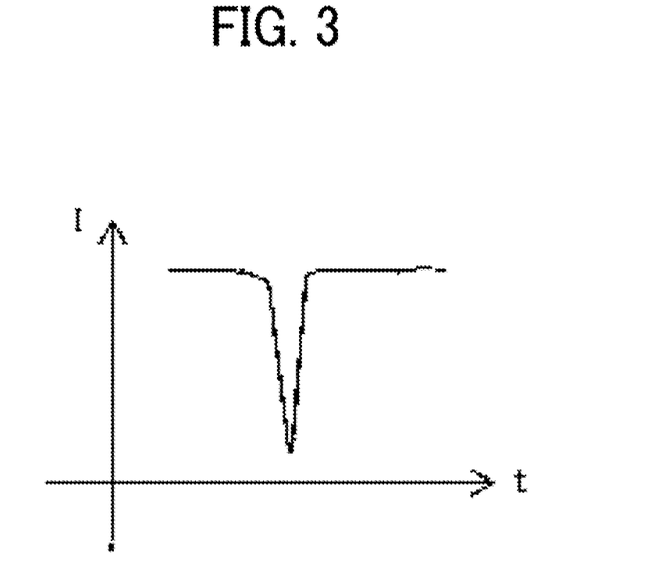
FIG. 3 is a graph showing the relationship between the current flowing through a counter electrode and time.

Next, the relationship between the current I that flows through the counter electrode 4 and the sample α1 will be described with reference to FIG. 2 and FIG. 3. FIG. 3 is a graph showing the relationship between the current I flowing through the counter electrode 4 and the time t.

As shown in FIG. 2 and FIG. 3, the sample α1 introduced into the reaction chamber 6 moves in the movement direction X. Then, electrons β attach to the sample α1 in the reaction chamber 6. As a result, the ion α2 is generated.

The ion α2 is transported by the first carrier gas and passes through the reaction chamber 6 without reaching the counter electrode 4. Therefore, the number of electrons β reaching the counter electrode 4 is reduced by the number of electrons β attaching to the sample α1. As a result, in comparison to when the sample α1 is not being introduced into the reaction chamber 6, the current I flowing through the counter electrode 4 is reduced when the sample α1 is being introduced into the reaction chamber 6.

Furthermore, there is a correlation between the amount of decrease in the current I and the number of samples α1. Specifically, the larger the amount of decrease in the current I, the larger the number of samples α1. Therefore, the controller 8 is capable of calculating the number of samples α1 based on the detection value of the current detector 7.

The controller 8, for example, calculates the number of samples α1 according to the following procedure. Firstly, the controller 8 calculates, based on the detection value of the current detector 7, the amount of reduction in the current I when the sample α1 is being introduced into the reaction chamber 6 in comparison to the current I when the sample α1 is not being introduced into the reaction chamber 6. Then, the controller 8 calculates the number of samples α1 based on the amount of reduction in the current I and a prescribed table stored in advance in the storage unit. The prescribed table is a table showing the relationship between the amount of reduction in the current I and the number of samples α1.

Therefore, the electron capture detector 100 is capable of detecting the number of samples α1 as a result of the current detector 7 detecting the current I flowing through the counter electrode 4.

As described above with reference to FIG. 2 and FIG. 3, the counter electrode 4 also serves as a detection electrode for detecting the current I. Therefore, because the ionization source that ionizes the sample α1 and the detector that detects the ion α2 do not need to be separated, the electron capture detector 100 can be made smaller.

Figure 4:
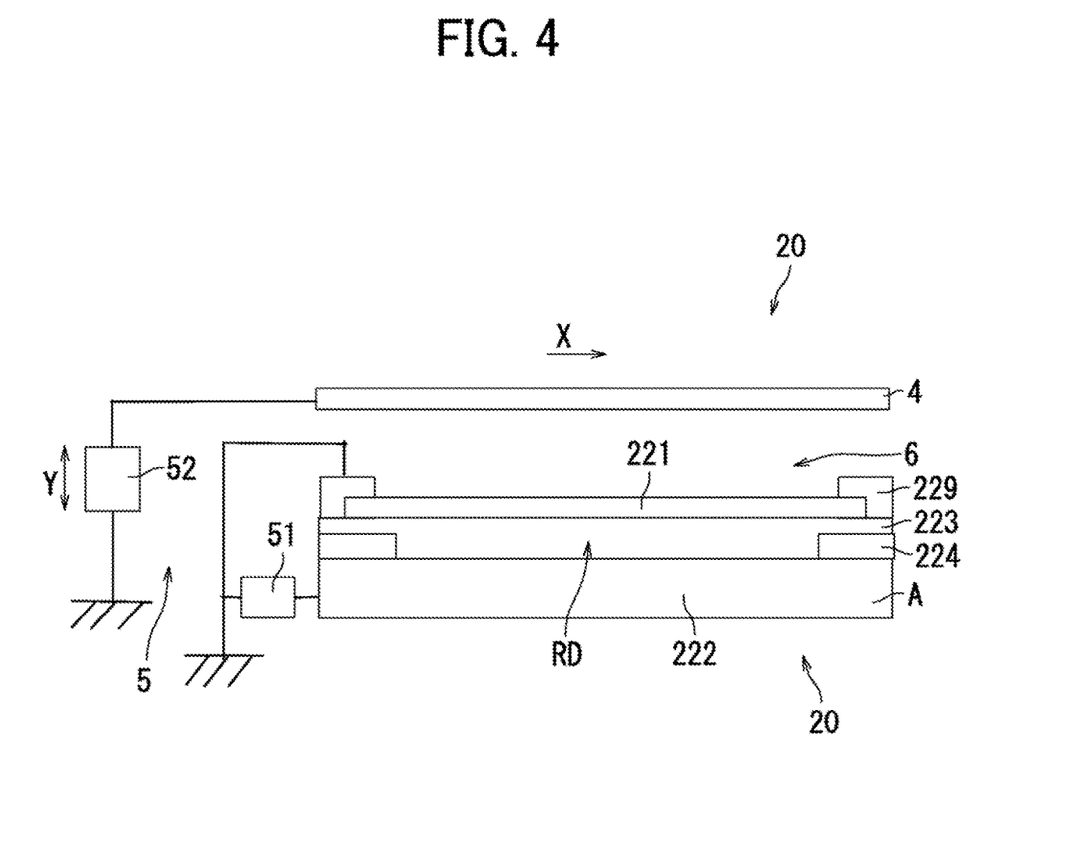
FIG. 4 is a schematic diagram showing an electron emitting element.

Next, the electron emitting element 20 will be described with reference to FIG. 4. FIG. 4 is a schematic diagram showing the electron emitting element 20.

As shown in FIG. 4, the electron emitting element 20 includes a surface electrode 221, a lower electrode 222, an intermediate layer 223, an insulating layer 224, and a wire electrode 229. Furthermore, the power supply unit 5 includes a first power supply 51 and a second power supply 52.

The surface electrode 221 faces the reaction chamber 6. Moreover, the surface electrode 221 faces the counter electrode 4 via the reaction chamber 6. The reaction chamber 6 is positioned between the surface electrode 221 and the counter electrode 4.

The spacing between the counter electrode 4 and the surface electrode 221 is, for example, 0.1 mm or more and 5 mm or less. The spacing between the counter electrode 4 and the surface electrode 221 is preferably 0.1 mm or more and 3 mm or less. The spacing between the counter electrode 4 and the surface electrode 221 is more preferably 1 mm or more and 2 mm or less.

The surface electrode 221 and the lower electrode 222 are disposed with a spacing between them. The intermediate layer 223 is disposed between the surface electrode 221 and the lower electrode 222. The intermediate layer 223 has a prescribed volume resistivity such that the intermediate layer 223 has a high resistance. The prescribed volume resistivity is, for example, $1\times10^5$ (Ω·m) or more, and $1\times10^9$ (Ω·m) or less.

The surface electrode 221 is positioned between the intermediate layer 223 and the reaction chamber 6.

The lower electrode 222 may be a substrate A if the substrate A is a conductive substrate such as a metal, or may be provided with a metal layer or a conductive layer if the substrate A is a plate made of an insulator. An insulating layer 224 is formed on the substrate A.

The insulating layer 224 is formed of a material having an insulating property. The insulating layer 224 blocks the current that flows from the lower electrode 222 to the surface electrode 221.

The electron emission region RD is a region that does not include the insulating layer 224.

The first power supply 51 applies a voltage between the surface electrode 221 and the lower electrode 222. The first power supply 51 is connected to the surface electrode 221 via the wire electrode 229. When a voltage is applied between the surface electrode 221 and the lower electrode 222, an electric field is generated in the intermediate layer 223, and this electric field generates electrons β in the intermediate layer 223, and these electrons β are emitted through the surface electrode 221 portion into the reaction chamber 6.

The voltage applied between the surface electrode 221 and the lower electrode 222 is, for example, 1 V or more and 100 V or less. The voltage applied between the surface electrode 221 and the lower electrode 222 is preferably 5 V or more and 30 V or less. The voltage applied between the surface electrode 221 and the lower electrode 222 is more preferably 10 V or more and 20 V or less.

The electric field strength between the surface electrode 221 and the lower electrode 222 is, for example, 1 kV/cm or more and 1000 kV/cm or less. The electric field strength between the surface electrode 221 and the lower electrode 222 is preferably 50 kV/cm or more and 500 kV/cm or less.

The second power supply 52 applies a voltage to the counter electrode 4. When the second power supply 52 applies a voltage to the counter electrode 4, the electrons β emitted through the surface electrode 221 portion into the reaction chamber 6 are attracted to the counter electrode 4 due to the electric field of the counter electrode 4. Note that the first power supply 51 and the second power supply 52 apply a voltage between the counter electrode 4 and the surface electrode 221 so that the potential of the counter electrode 4 becomes higher than the potential of the surface electrode 221. The voltage applied between the counter electrode 4 and the surface electrode 221 is, for example, 100 V or more and several thousands of V or less.

The energy of the electrons β emitted from the electron emitting element 20 will be described.

The energy of the electrons β emitted by the electron emitting element 20 is lower than the ionization potential of the sample α1. The electrons β emitted from the electron emitting element 20 are preferably electrons β having a sufficiently low energy so that an electron attachment phenomenon occurs. For example, the energy of the electrons β emitted from the electron emitting element 20 is greater than 0 eV and 10 eV or less. Therefore, when the electron emitting element 20 emits low-energy electrons β, the low-energy electrons attach to the sample α by an electron attachment phenomenon. As a result, alteration of the sample α1 can be suppressed, and the detection sensitivity of the ion α2 can be improved. Note that the alteration of the sample α1 represents the decomposition of the sample α1 from the energy of the electrons β, resulting in the formation of many decomposition products.

Furthermore, in the first embodiment, the electron capture detector 100 generates the ion α2, which is a negative ion, from the sample α1, and uses the ion α2 to analyze the sample α1. Therefore, by using a negative ion, the sample α1 can be ionized by low-energy electrons β. Moreover, because low-energy electrons β are used, decomposition of the sample α1 can be suppressed when ionizing the sample α1.

In addition, the electron affinity differs according to the type of sample α1. Therefore, the detection accuracy of the electron capture detector 100 can be improved by changing the energy of the electrons β emitted by the electron emitting element 20 according to the type of sample α1. Furthermore, by changing the energy of the electrons β, the analysis range of the detection target substances of the electron capture detector 100 is increased.

When the energy of the electrons β is toward the low end of the range of 0 eV to 10 eV, the electrons β attach to the sample α1 by, for example, a non-dissociative electron capture reaction. Moreover, when the energy of the electrons β is toward the high end of the range of 0 eV to 10 eV, the electrons β attach to the sample α1 by, for example, a dissociative electron capture reaction. Note that, from the viewpoint of being able to improve the detection sensitivity of the ion α2, it is advantageous for the electrons β to attach to the sample α1 by a non-dissociative electron capture reaction than for the electrons β to attach to the sample α1 by a dissociative electron capture reaction.

The energy of the electrons β can be calculated based on the voltage applied by the power supply unit 5 by measuring the relationship between a first voltage, a second voltage, and the energy of the electrons β in advance. The first voltage represents the voltage applied between the surface electrode 221 and the lower electrode 222. The second voltage represents the voltage applied between the surface electrode 221 and the counter electrode 23.

Next, the intermediate layer 223 will be described with reference to FIG. 4.

As shown in FIG. 4, in the first embodiment, the intermediate layer 223 contains a resin and conductive fine particles dispersed in the resin. The resin is, for example, a silicone resin obtained by condensation polymerization of a silanol (R3-Si—OH). As the conductive fine particles, metal particles having conductivity such as gold, silver, platinum, or palladium may be used. Further, conductive materials other than metal particles such as carbons, conductive polymers and/or a semi-conductive material may be used. The content of the conductive fine particles in the intermediate layer 223 can be appropriately set. The resistance value of the intermediate layer 223 can be adjusted by changing the content of the conductive fine particles. The intermediate layer 223 is formed by a coating method such as a spin coating method, a doctor blade method, a spray method, or a dipping method.

An example of the preparation method of the intermediate layer 223 will be described.

Firstly, 3 g of a silicone resin (room temperature-curable resin, manufactured by Shin-Etsu Chemical Co., Ltd.) serving as the resin, and 0.03 g of Ag nanoparticles (average diameter 10 nm, insulation-coated with 1 nm alcoholate film, manufactured by Applied Nanoparticle Laboratory Corp.) serving as the conductive fine particles are placed in a reagent bottle and mixed. As a result, a mixed solution of the silicone resin and the Ag nanoparticles is produced. Next, a coating liquid is prepared by further stirring the mixed solution placed in the reagent bottle using an ultrasonic vibrator. The viscosity of the coating liquid is, for example, 0.8 to 15 mPa·s. The proportion of the resin composition in the coating liquid is, for example, 10 to 70 wt %. After being applied to the substrate A, the coating liquid is subjected to condensation polymerization by the humidity in the air to form a silicone resin, thereby forming the intermediate layer 223.

Furthermore, the surface electrode 221 can have a thickness of 5 nm or more and 100 nm or less, and preferably has a thickness of 40 nm or more and 100 nm or less. Moreover, in order to prevent excessive breakages as a whole, the material of the surface electrode 221 uses a plurality of conductive materials having high electrical conductivity, such as gold, platinum, semiconductors, ITO (indium tin oxide), and carbons. Also, the surface electrode 221 may be configured by a plurality of metal layers.

If the thickness of the surface electrode 221 is 40 nm or more, the surface electrode 221 may have a plurality of openings, gaps and/or thin portions in which the thickness is 10 nm or less. The electrons generated in the intermediate layer 223 are capable of passing or penetrating through these openings, gaps and/or thin portions, which enables the electrons to be emitted from the surface electrode 221. The openings, gaps and/or thin portions can also be formed by subjecting the metal constituting the surface electrode 221 to a thin-film formation process (a sputter method or deposition method) accompanied by a general patterning process.

The material of the lower electrode 222 is, for example, aluminum, stainless steel, or nickel. The thickness of the lower electrode 222 can be, for example, 200 μm or more and 1 mm or less.

Second Embodiment

Figure 5:
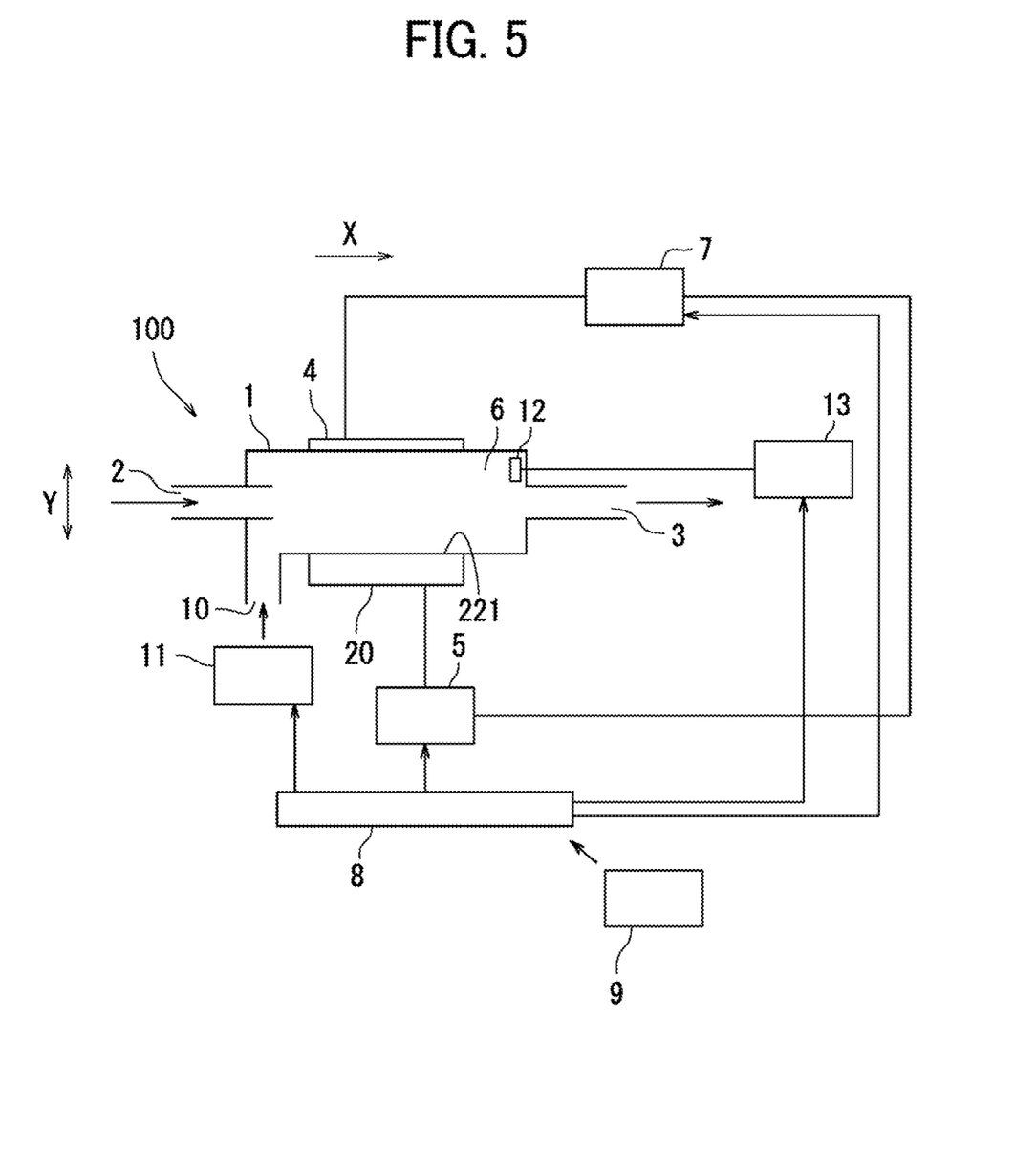
FIG. 5 is a schematic diagram showing a second embodiment of an electron capture detector.

Next, a second embodiment of the electron capture detector 100 will be described with reference to FIG. 5. FIG. 5 is a schematic diagram showing the second embodiment of the electron capture detector 100.

The second embodiment differs from the first embodiment in that a second carrier gas is introduced into the reaction chamber 6 in addition to the first carrier gas. Hereinafter, the aspects that differ from the first embodiment will be mainly described.

As shown in FIG. 5, the electron capture detector 100 further includes a carrier gas inlet 10 and a carrier gas supply unit 11.

The carrier gas inlet 10 introduces the second carrier gas into the reaction chamber 6. The carrier gas inlet 10 is an opening that leads to the reaction chamber 6. The carrier gas inlet 10 communicates the reaction chamber 6 with the outside of the detection cell 1. The carrier gas inlet 10 is disposed upstream of the reaction chamber 6 in the movement direction X.

The carrier gas supply unit 11 is connected to the carrier gas inlet 10. The carrier gas supply unit 11 supplies the second carrier gas to the carrier gas inlet 10. As a result, the carrier gas inlet 10 introduces the second carrier gas into the reaction chamber 6.

The second carrier gas does not contain the sample α1. The second carrier gas represents an inert gas to which electrons β do not readily attach. Examples of the second carrier gas include gases such as helium, argon, hydrogen, and nitrogen. Except for not containing the sample α1, the composition of the second carrier gas component may be the same composition as the first carrier gas. Furthermore, the composition of the second carrier gas may be a different composition to that of the first carrier gas.

After being introduced from the carrier gas inlet 10 into the reaction chamber 6, the second carrier gas moves in the movement direction X and passes through the reaction chamber 6. After passing through the reaction chamber 6, the second carrier gas is discharged to the outside of the detection cell 1 via the exhaust port 3.

In the second embodiment, the sample inlet 2 introduces the first carrier gas containing the sample α1 into the reaction chamber 6. In contrast, the carrier gas inlet 10 introduces the second carrier gas, which does not contain the sample α1, into the reaction chamber 6.

The sample inlet 2 and the carrier gas inlet 10 may simultaneously introduce the first carrier gas and the second carrier gas into the reaction chamber 6. In this case, even if the first carrier gas is insufficient, the shortage of the first carrier gas can be supplemented by the second carrier gas.

Furthermore, the sample inlet 2 may introduce the first carrier gas into the reaction chamber 6 after the carrier gas inlet 10 introduces the second carrier gas into the reaction chamber 6. In this case, the first carrier gas can be introduced into the reaction chamber 6 after the reaction chamber 6 has been cleaned by the second carrier gas. As a result, it becomes possible to more efficiently generate the ion α2.

The temperature of the second carrier gas introduced into the reaction chamber 6 by the carrier gas inlet 10 may be set to a prescribed temperature. Specifically, the sample inlet 2 may introduce the sample α1 into the reaction chamber 6 after the carrier gas inlet 10 introduces the second carrier gas having the prescribed temperature into the reaction chamber 6. As a result, compounds or the like that are not related to the sample to be detected can be removed in advance, and interference with the ionization of the sample α1 can be effectively suppressed. The prescribed temperature is a higher temperature than the temperature around the electron capture detector 100, and is preferably 50° C. or higher.

Furthermore, as a result of the carrier gas inlet 10 introducing the second carrier gas having the prescribed temperature into the reaction chamber 6, the attachment and accumulation of the sample α1 to the surface electrode 221 or the counter electrode 4 can be suppressed, and interference with the ionization of the sample α1 can be suppressed. In addition, the durability of the electron emitting element 20 can be improved. Also, because the attachment of the sample α1 to the surface electrode 221 or the counter electrode 4 can be suppressed, the time required for maintenance of the surface electrode 221 and the counter electrode 4 can be shortened. If the time required for maintenance can be shortened, the time interval (recovery time interval) required prior to the next measurement by the electron emitting element 20 can be shortened.

The electron capture detector 100 further includes an ion control electrode 12 and an ion control electrode controller 13.

The ion control electrode 12 is disposed downstream of the reaction chamber 6 in the movement direction X. The ion control electrode 12 is disposed downstream of the counter electrode 4 in the movement direction X. The potential of the ion control electrode 12 is higher than the potential of the counter electrode 4. The ion control electrode controller 13 controls the potential of the ion control electrode 12.

As a result of the ion control electrode controller 13 setting the potential of the ion control electrode 12 higher than the potential of the counter electrode 4, the ion α2 is attracted to the counter electrode 4. Consequently, the ion α2 can pass through the reaction chamber 6 with more certainty.

Third Embodiment

Figure 6:
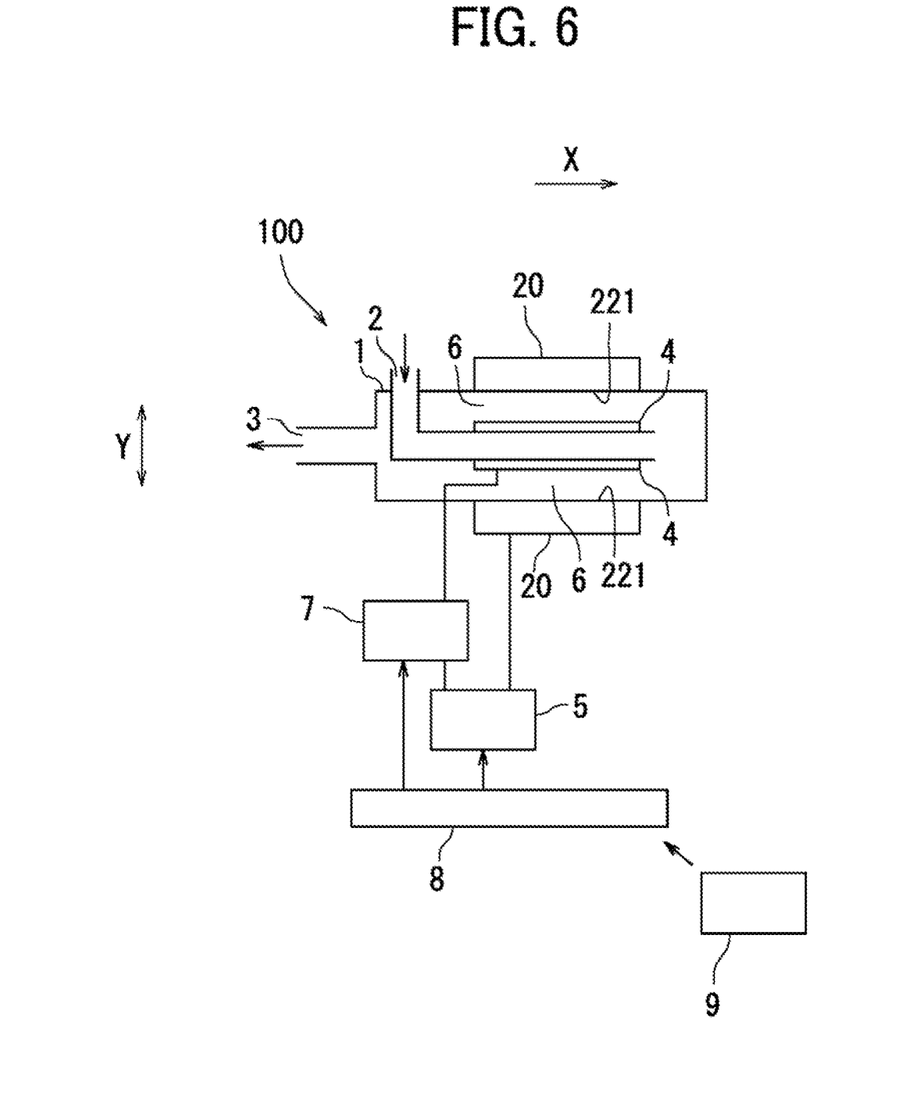
FIG. 6 is a schematic diagram showing a third embodiment of an electron capture detector.

Next, a third embodiment of the electron capture detector 100 will be described with reference to FIG. 6. FIG. 6 is a schematic diagram showing the third embodiment of the electron capture detector 100.

In the third embodiment, the shape of the reaction chamber 6 differs from that of the first embodiment. Hereinafter, the aspects that differ from the first embodiment will be mainly described.

As shown in FIG. 6, in the electron capture detector 100 of the third embodiment, the reaction chamber 6 has a cylindrical shape. In the following, the shape of each component of the electron capture detector 100 will be described in detail.

The sample inlet 2 has a cylindrical shape with openings formed at both ends. The sample inlet 2 penetrates into the detection cell 1. One end of the sample inlet 2 is positioned outside the detection cell 1. Another end of the sample inlet 2 is positioned inside the detection cell 1. The other end of the sample inlet 2 extends along the movement direction X.

The sample α1 is supplied from the opening at the one end of the sample inlet 2, and is discharged from the opening at the other end of the sample inlet 2. As a result, the sample α1 is introduced into the reaction chamber 6.

The counter electrode 4 is provided on the outer circumferential surface of the other end of the sample inlet 2. The counter electrode 4 has a cylindrical shape that follows the outer circumferential surface of the other end of the sample inlet 2.

The surface electrode 221 of the electron emitting element 20 is provided on the inner circumferential surface of the detection cell 1. The surface electrode 221 has a cylindrical shape that follows the inner circumferential surface of the detection cell 1.

The counter electrode 4 is disposed on the inside of the surface electrode 221. The inner circumferential surface of the surface electrode 221 faces the outer circumferential surface of the counter electrode 4. The reaction chamber 6, which has a cylindrical shape, is disposed between the inner circumferential surface of the surface electrode 221 and the outer circumferential surface of the counter electrode 4.

As described with reference to FIG. 6 above, as a result of disposing the other end of the sample inlet 2 inside the detection cell 1 and providing the counter electrode 4 on the other end of the sample inlet 2, it is possible to form the reaction chamber 6 with a cylindrical shape.

Embodiments of the present invention have been described above with reference to the drawings (FIG. 1 to FIG. 6). However, the present invention is not limited to the embodiments described above, and implementation in various forms is possible within a scope not departing from the spirit thereof (for example, (1)). Furthermore, various inventions can be formed by appropriately combining a plurality of the components disclosed in the above embodiments. For example, some components may be removed from among the components presented in the embodiments. In the drawings, each component is schematically shown mainly for ease of understanding, and the number of each component in the drawings may be different from that in an actual device for convenience of preparing the drawings. Moreover, the components presented in the embodiments above are merely examples and are not particularly limited, and further, various modifications can be made without substantially departing from the spirit of the present invention.

(1) In the first embodiment to the third embodiment, as shown in FIG. 4, the intermediate layer 223 includes a silicone resin and conductive fine particles dispersed in the silicone resin. However, the invention is not limited to this.

Figure 7:
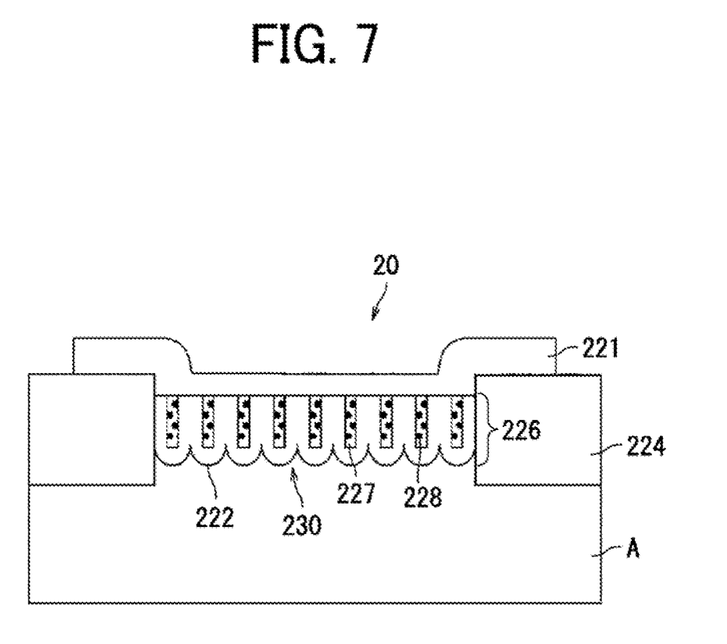
FIG. 7 is a diagram showing a modification of an intermediate layer.

The intermediate layer 230, which is a modification of the intermediate layer 223, will be described with reference to FIG. 7. FIG. 7 is a diagram showing the intermediate layer 230.

As shown in FIG. 7, the intermediate layer 230 includes a porous alumina layer 226. The porous alumina layer 226 includes a plurality of pores 227. Conductive fine particles 228 are supported inside the pores 227.

The lower electrode 222 is configured by, for example, an aluminum substrate having a thickness of 0.5 mm. The porous alumina layer 226 is an anodized layer formed on the surface of the substrate A. The porous alumina layer 226 may be an anodized layer formed on the surface of an aluminum layer supported by the substrate A. If the substrate A is an insulating substrate such as a glass substrate, a conductive layer can be formed between the aluminum layer and the substrate A, and the aluminum layer and the conductive layer can be used as the lower electrode 222. The thickness of the aluminum layer which functions as the lower electrode 222 is preferably, for example, 10 μm or more.

The pores 227 are open on the upper surface of the porous alumina layer 226. The pores 227 are sunk down toward the interface between the porous alumina layer 226 and the lower electrode 222. A plurality of pores 227 are provided, and are arranged to be distributed inside the electron emission region. The pores 227 have a depth that does not reach the lower electrode 222.

The diameter of the pores 227 is, for example, 50 nm or more and 3 μm or less. The diameter of the pores 227 may vary in the depth direction, and may have a smaller diameter on the bottom side. The thickness of the porous alumina layer 226 is preferably 10 nm or more and 5 μm or less.

Any type of conductor can be used as the conductive fine particles 228, as long as it can be supported on alumina. The particle size of the conductive fine particles 228 is, for example, smaller than the diameter of the pores 227. The particle size of the conductive fine particles 228 is, for example, 1 nm or more and 80 nm or less. The particle size of the conductive fine particles 228 is preferably 3 nm or more and 10 nm or less.

For example, when silver nanoparticles are used as the conductive fine particles 228, the particle size of the conductive fine particles 228 is preferably 1 nm or more and 50 nm or less. Furthermore, in this case, the particle size of the conductive fine particles 228 is more preferably 3 nm or more and 10 nm or less. The silver nanoparticles may be coated with an organic compound. The organic compound is, for example, an alcohol derivative and/or a surfactant.

INDUSTRIAL APPLICABILITY

The present invention is applicable to the field of electron emitting elements.

DESCRIPTION OF REFERENCE NUMERALS

1 Detection cell
2 Sample inlet
4 Counter electrode
6 Reaction chamber
7 Current detector
10 Carrier gas inlet
20 Electron emitting element
100 Electron capture detector
221 Surface electrode
222 Lower electrode
223, 230 Intermediate layer
226 Porous alumina layer
229 Wire electrode
α1 Sample
β Electron
α2 Ion

The invention claimed is:

1. An electron capture detector for detecting a sample, comprising:
a detection cell that forms a reaction chamber;
a sample inlet which introduces a first carrier gas containing the sample into the reaction chamber; and
an electron emitting element that emits electrons into the reaction chamber, wherein
the electron emitting element includes:
a surface electrode facing the reaction chamber, and
a lower electrode facing the surface electrode, wherein
the electrons are emitted from the surface electrode to the reaction chamber as a result of a voltage being applied between the surface electrode and the lower electrode.

2. The electron capture detector according to claim 1, wherein
an ion derived from a sample component is generated as a result of the electron emitting element emitting the electrons into the reaction chamber.

3. The electron capture detector according to claim 1, further comprising
a counter electrode facing the surface electrode via the reaction chamber.

4. The electron capture detector according to claim 3, further comprising
a current detector that detects a current flowing through the counter electrode.

5. The electron capture detector according to claim 1, wherein
the reaction chamber has a square pillar shape or a cylindrical shape.

6. The electron capture detector according to claim 1, wherein
an energy of the electrons emitted by the electron emitting element is lower than an ionization potential of the sample.

7. The electron capture detector according to claim 1, wherein
an energy of the electrons emitted by the electron emitting element is greater than 0 eV and 10 eV or less.

8. The electron capture detector according to claim 1, further comprising
a carrier gas inlet that introduces a second carrier gas into the reaction chamber, wherein
the second carrier gas does not contain the sample.

9. The electron capture detector according to claim 8, wherein
the sample inlet introduces the first carrier gas into the reaction chamber after the carrier gas inlet introduces the second carrier gas into the reaction chamber.

10. The electron capture detector according to claim 8, wherein
the second carrier gas has a prescribed temperature.

11. The electron capture detector according to claim 1, wherein:
the electron emitting element further includes an intermediate layer positioned between the surface electrode and the lower electrode, and
the intermediate layer has a prescribed volume resistivity.

12. The electron capture detector according to claim 11, wherein
the intermediate layer contains a silicone resin and conductive fine particles dispersed in the silicone resin, or contains a porous alumina layer.

\* \* \* \* \*